UNITED STATES PATENT OFFICE.

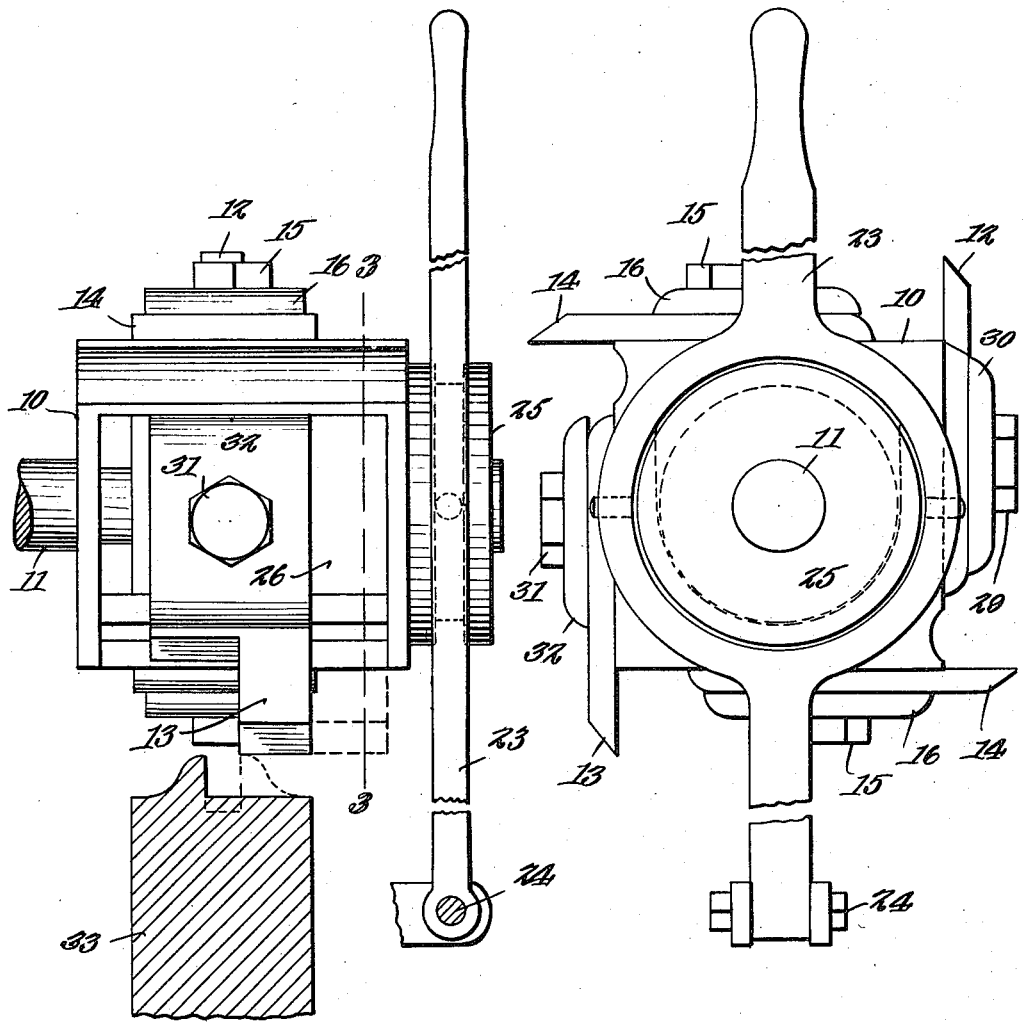

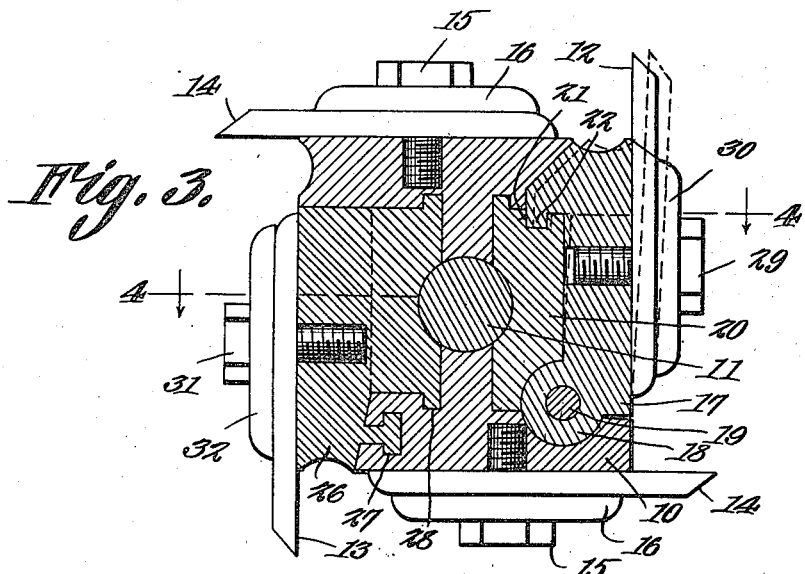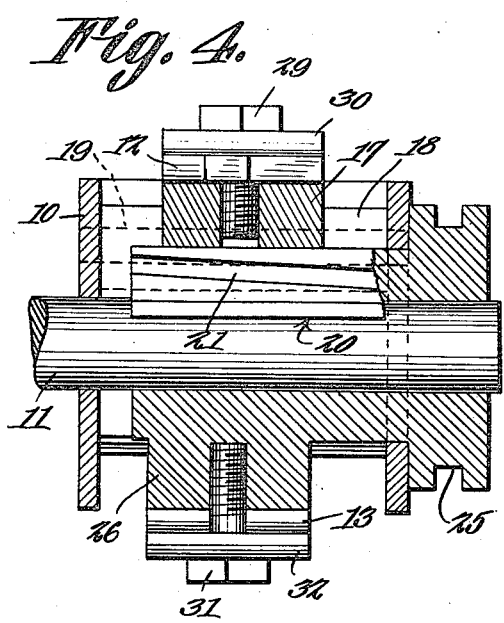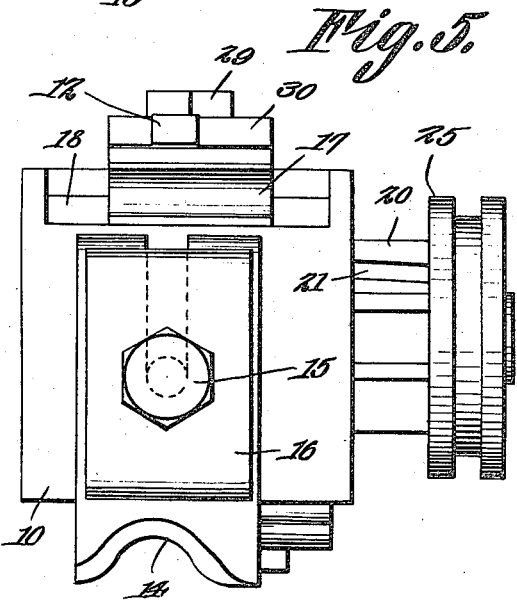

WILLIAM E. CEDERHOLM, OF RAINIER, OREGON.

ROTARY WOODWORKING-CUTTER.

1,201,696.   Specification of Letters Patent.   Patented Oct. 17, 1916.

Application filed January 15, 1916. Serial No. 72,248.

*To all whom it may concern:*

Be it known that I, WILLIAM E. CEDERHOLM, a citizen of the United States, residing at Rainier, in the county of Columbia and State of Oregon, have invented new and useful Improvements in Rotary Woodworking-Cutters, of which the following is a specification.

This invention relates to woodworking cutters consisting of a cutter head armed with a series of bits which are shaped and arranged to produce a certain pattern.

The cutter which is the subject matter of the present application for patent is designed more particularly for producing a mortised molding and a rabbet in the edges of door stiles so that the upper portion of the door may be glazed and the lower portioned paneled, and the invention has for its object to provide a cutter which may be adjusted to effect both of these cutting operations without stoppage.

With the object stated in view, the invention consists in a novel combination and arrangement of parts to be hereinafter described and claimed and in order that the same may be better understood, reference is had to the accompanying drawings, in which—

Figure 1 is a front elevation of the cutter; Fig. 2 is an end view thereof; Fig. 3 is a cross section on the line 3—3 of Fig. 1; Fig. 4 is a longitudinal section on the line 4—4 of Fig. 3, and Fig. 5 is a plan view.

Referring specifically to the drawings, 10 denotes a rotary cutter head of polygonal cross-section mounted on a shaft 11, and carrying cutting bits which vary in contour according to the pattern to be produced. As stated, the cutter is designed to cut a molding on the edges of the stiles of doors which have a top glass and a paneled bottom part. That part of the stile which is to receive the panel has its edge mortised and formed with a molding and that part of the stile which is to receive the glass is formed with a rabbet. Ordinarily, the mortise and the molding are made throughout the entire length of the stile, and the stile is then taken to another machine and the molding is cut partly away on one side to form the rabbet; or the stile is first cut for the glass and then for the panel. Both of these operations take time as the machine must be stopped after each cut. The cutter which is the subject matter of the present application for patent has therefore been designed to make the two different kinds of cuts without stopping the machine or the feed, this object being attained by the following means: On one side of the cutter head 10 is mounted a mortising bit 12, and on the opposite side is mounted a rabbeting bit 13 which cuts away the molding to form the rabbet. On the other sides of the cutter head are mounted cutting bits 14 which are shaped to produce the molding. The bits 14 are clamped to the plane faces of the cutter head by screws 15 and a backing plate 16, this being an ordinary construction for which no novelty is claimed.

The mortising bit 12 is carried by a pivoted supporting member 17, said member seating in a recess in one of the faces of the cutter head 10 and having at one end a hinge knuckle 18 through which passes a hinge pin 19 carried by the cutter head. The hinge pin 19 is parallel to the axis of the shaft 11, and the member 17 may therefore be swung to position the cutting edge of the bit 12 different distances from the cutter axis, whereby the depth of the mortise to be cut may be varied. This adjustment is effected by the following means: Slidably mounted in a longitudinal recess in the cutter head 10 is a block 20 having a longitudinal groove 21 in which seats a corresponding tongue 22 on the member 17. The slide block 20 is mounted to slide parallel to the shaft 11 or the axis of the cutter head, and the groove 21 is inclined with respect to the shaft as clearly shown in Fig. 4, the tongue 22 being correspondingly shaped. Hence it will be seen that when the slide block is operated, the member 17 will be swung to advance or to retract the bit 12, according to the direction in which the slide block is moved.

The slide block 20 is operated by means of a shifting lever or yoke 23 fulcrumed at 24 to any convenient portion of the machine, and having a connection with a peripherally grooved collar 25 on one end of the block, the shaft 11 passing loosely through the center of the collar so that the latter is free to slide back and forth on the shaft.

The rabbeting bit 13 is carried by a slide 26 mounted in T-slots 27 and 28 in the cutter head 10, said slide being integral with, or separate from and made fast to the collar 25, so that it may also be shifted by the lever 23. The slide 26 is movable parallel to the axis of the cutter head, in view of which it will be evident that the bit 13 may be correspondingly shifted. This adjustment is for the purpose of positioning the bit 13 so that it may clear the path in which the molding bits 14 travel as shown dotted in Fig. 1, and upon advancing the bit as shown in full lines, it cuts off the molding on one side to form the rabbet.

The bit 12 is secured to the slide block 20 by a screw 29 and a backing plate 30. A similar screw 31 and a backing plate 32 are employed for securing the bit 13 to the slide 26. Any other suitable means may be provided for securing the bits.

The operation of the device will best be understood from an inspection of Fig. 1. Here a fragment of the door stile is shown at 33, with the molding and mortise partly in full lines and partly dotted, the same having been made by the bits 12 and 14, the former cutting the mortise and the latter the molding. While this cut was being made, the bit 13 had been shifted to one side, as shown dotted, in which position it is in inoperative position, clear of the stile and out of the path in which the cutters 14 work. The slide block 20 had also been pulled out as shown in Fig. 5, to project the bit 12 as shown dotted in Fig. 3, in which position the bit cuts the full depth of the mortise as shown dotted in Fig. 1. When that part of the stile which is to be rabbeted is reached, the collar 25 is shifted inward, whereby the bit 12 is retracted to the full line position shown in Fig. 3, and the bit 13 is advanced to cut off the dotted portion of the molding shown in Fig. 1. The bits 12 and 13 now cut the rabbet, the depth of which is less than the depth of the mortise.

The cutting edges of bits 12 and 13 in the last described position are spaced the same distance from the cutter axis so that they cut the rabbet perfectly smooth up to that portion of the molding which remains undisturbed. The adjustment of the bits 12 and 13 is effected simultaneously by means of the lever 23 as the slide block 20 and the slide 26 are both fixed to or integral with the collar 25, and the change from one operation to the other may be made without stopping the machine.

I claim:—

1. A rotary cutter comprising a cutter head, and fixed and adjustable bits carried by said head, the adjustable bit being movable parallel to the axis of the cutter head into and out of the path of travel of the fixed bit.

2. A rotary cutter comprising a cutter head, fixed and adjustable bits carried by said head, the adjustable bit being movable parallel to the axis of the cutter head into and out of the path of travel of the fixed bit, and another bit carried by the cutter head, and having an adjustable connection therewith to vary the distance of its cutting edge from the axis of the cutter.

3. A rotary cutter comprising a cutter head, bits carried by said head, a bit carried by the cutter head and adjustable parallel to the axis thereof into and out of the path of travel of the first mentioned bits, a pivoted member carried by the cutter head, the pivotal axis of said member being parallel to the cutter axis, a bit carried by said member, and means for swinging the pivoted member to vary the distance of the cutting edge of its bit from the axis of the cutter.

4. A rotary cutter comprising a cutter head, bits carried by said head, a bit carried by the cutter head and adjustable parallel to the axis thereof into and out of the path of travel of the first mentioned bits, a pivoted member carried by the cutter head, the pivotal axis of said member being parallel to the cutter axis, a bit carried by said member, a slide block carried by the cutter head and movable parallel to the axis thereof, a tongue-and-groove connection between the slide block and the pivoted member, said connection being inclined to the cutter axis, and actuating means for the slide block.

5. A rotary cutter comprising a cutter head, bits carried by said head, a slide carried by the cutter head and movable parallel to the axis thereof, a bit carried by the slide, and another bit carried by the cutter head, and having an adjustable connection therewith to vary the distance of its cutting edge from the axis of the cutter.

6. A rotary cutter comprising a cutter head, bits carried by said head, a slide carried by the cutter head and movable parallel to the axis thereof, a bit carried by the slide, a pivoted member carried by the cutter head, the pivotal axis of said member being parallel to the cutter axis, a bit carried by said member, means for swinging the pivoted member to vary the distance of the cutting edge of its bit from the axis of the cutter, and a connection between said means and the slide.

7. A rotary cutter comprising a cutter head, bits carried by said head, a slide carried by the cutter head and movable parallel to the axis thereof, a bit carried by the slide, a pivoted member carried by the cutter head, the pivotal axis of said member being parallel to the cutter axis, a bit carried by said member, and means for swinging the pivoted member to vary the distance of the cutting edge of its bit from the axis of the cutter.

8. A rotary cutter comprising a cutter head, bits carried by said head, a slide carried by the cutter head and movable parallel to the axis thereof, a bit carried by the slide, a pivoted member carried by the cutter head, the pivotal axis of said member being parallel to the cutter axis, a bit carried by said member, a slide block carried by the cutter head and movable parallel to the axis thereof, a tongue-and-groove connection between the slide block and the pivoted member, said connection being inclined to the cutter axis, and actuating means for the slide block.

9. A rotary cutter comprising a cutter head, bits carried by said head, a slide carried by the cutter head and movable parallel to the axis thereof, a bit carried by the slide, a pivoted member carried by the cutter head, the pivotal axis of said member being parallel to the cutter axis, a bit carried by said member, a slide block carried by the cutter head and movable parallel to the axis thereof, a tongue-and-groove connection between the slide block and the pivoted member, said connection being inclined to the cutter axis, actuating means for the slide block, and a connection between said actuating means and the slide.

In testimony whereof I affix my signature.

WILLIAM E. CEDERHOLM.